United States Patent [19]

Thomas et al.

[11] 4,270,067
[45] May 26, 1981

[54] ELECTRIC FRYING PAN

[75] Inventors: Alvin W. Thomas, Waterdown; Benjamin G. Mills, Oakville, both of Canada

[73] Assignee: Trans-Canada Life-Ware Limited, Oakville, Canada

[21] Appl. No.: 952,883

[22] Filed: Oct. 18, 1978

[30] Foreign Application Priority Data

Oct. 18, 1977 [CA] Canada ................................ 288966

[51] Int. Cl.³ ............................................ F27D 11/02
[52] U.S. Cl. ................................. 219/438; 99/425; 219/430; 219/439; 219/463; 219/535; 219/536; 219/530
[58] Field of Search ............... 219/275, 430, 432, 433, 219/438, 439, 441, 449, 462, 463, 464, 530, 535, 536, 540, 455, 456, ; 99/425

[56] References Cited

U.S. PATENT DOCUMENTS

| | | | |
|---|---|---|---|
| 2,504,728 | 4/1950 | Purpura | 219/441 |
| 2,522,718 | 9/1950 | Huck | 219/536 |
| 2,772,344 | 11/1956 | Bowen et al. | 219/535 X |
| 2,899,126 | 8/1959 | Sadler | 219/275 |
| 2,938,990 | 5/1960 | Levine | 219/441 |
| 3,082,313 | 3/1963 | Jepson et al. | 219/441 |
| 3,130,664 | 4/1964 | Jarmuth et al. | 219/463 X |
| 3,258,196 | 6/1966 | Knox et al. | 219/275 X |
| 3,302,864 | 2/1967 | Nocolas | 219/275 |
| 3,317,709 | 5/1967 | Beasley | 219/449 |
| 3,569,672 | 3/1971 | Hurko | 219/464 |
| 3,789,189 | 1/1974 | Fischer et al. | 219/464 |
| 3,798,415 | 3/1974 | Graham | 219/441 |
| 3,826,898 | 7/1974 | Hurko et al. | 219/462 |
| 3,831,002 | 8/1974 | Mysicka et al. | 219/432 |
| 3,881,090 | 4/1975 | Scott | 219/433 |

FOREIGN PATENT DOCUMENTS

| | | | |
|---|---|---|---|
| 451303 | 9/1948 | Canada | 219/438 |
| 399452 | 2/1924 | Fed. Rep. of Germany | 219/438 |
| 50-15219 | 3/1975 | Japan | 219/439 |
| 98516 | 3/1923 | Switzerland | 219/438 |
| 249084 | 3/1948 | Switzerland | 219/438 |
| 365394 | 1/1932 | United Kingdom | 219/438 |
| 611374 | 10/1948 | United Kingdom | 219/275 |

OTHER PUBLICATIONS

WO79/00957, Apr. 1979, Landfors A.A.

Primary Examiner—Volodymyr Y. Mayewsky
Attorney, Agent, or Firm—Rogers, Bereskin & Parr

[57] ABSTRACT

The invention relates to an improved frying pan providing good thermal contact between the pan bottom and the heating element, the device comprising a pan adapted with threaded studs to the underside thereof, a support plate adapted with a depression shaped to hold a heating element and further adapted with holes for engaging the support plate on the studs, whereby when locknuts are tightened onto the studs, all parts of the heating element are subject to compression.

4 Claims, 2 Drawing Figures

ELECTRIC FRYING PAN

This invention relates to an improved electric frying pan and more particularly to a frying pan incorporating a heating element which gives improved thermal contact with the pan bottom and which is replaceable.

Commonly, so-called electric frying pans are constructed with a heating unit, which includes a circular heating element, and an aluminum pan which is cast around the element. Alternatively, a stainless steel pan is used and a circular valley-shaped depression, in which the element will fit, is reamed out of the bottom of the pan. The element is then fixed in position in the depression by welding it to the pan bottom. The element is normally in contact with the pan only at the weld and is left exposed. In order to avoid excessive local heating to the pan bottom, this welding must be localized and requires precision welding techniques as well as particular weld material. In addition, the heating unit is permanently fixed to the pan bottom and once the heating unit fails (the heating unit is normally the first component of a good quality frying pan to fail), the complete frying pan must be replaced. A further disadvantage with the conventional frying pan is its tendency to be somewhat inefficient because of a poor thermal contact between the heating element and the pan bottom, which causes excess heat usage. Without a flush contact with the pan bottom, less heat is transferred to the pan bottom because the heat transfer is then accomplished by convention above the heating element together with the conduction through the small cross-section of the weld. For better efficiency, it is preferable that all heat transfer be by conduction.

It is the purpose of the present invention to provide an electric frying pan with a replaceable heating unit and which provides good thermal contact between the heating element and the pan bottom to enhance thermal efficiency.

Accordingly, an improved electric frying pan is devised comprising a pan having a bottom and continuous peripheral side wall, a plurality of threaded studs connected to the underside of the pan, a heating element adapted to be connected to an electrical source, a support plate defining a depression to contain the heating element and holes for engaging the support plate on the studs, the depth of the depression in the support plate being less than the thickness of the heating element in order that when locknuts are tightened onto the studs, all parts of the heating element are subject to compression. The heating element is thereby positioned and maintained in good thermal contact with the pan bottom, the criticality of the tolerances achieveable when forming the depression in the support plate is minimized, and the heating element is rendered replaceable.

The invention will be better understood with reference to the drawings, in which.

Figure 1:
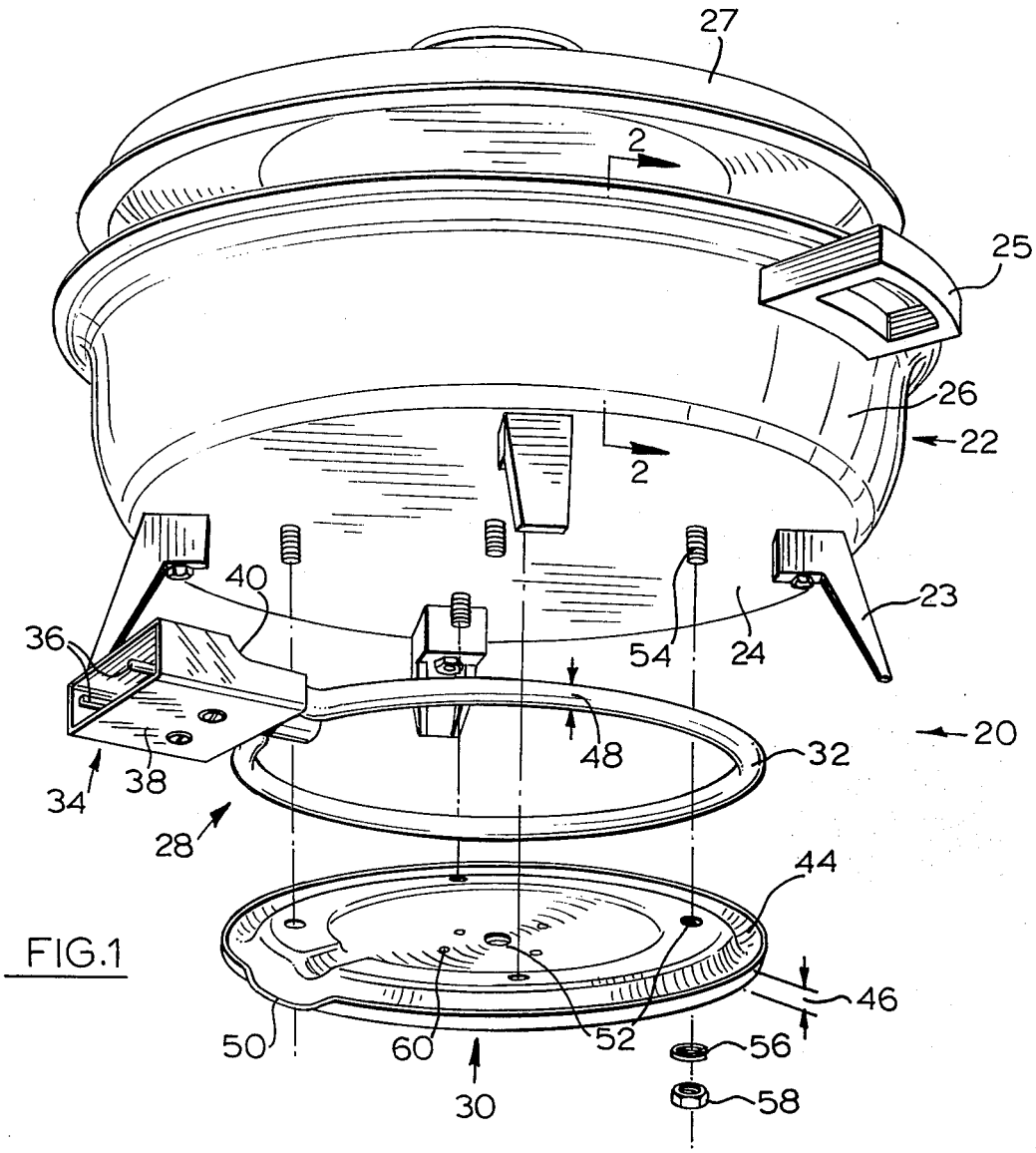
FIG. 1 is an exploded perspective view of a preferred embodiment of the invention.
Figure 2:
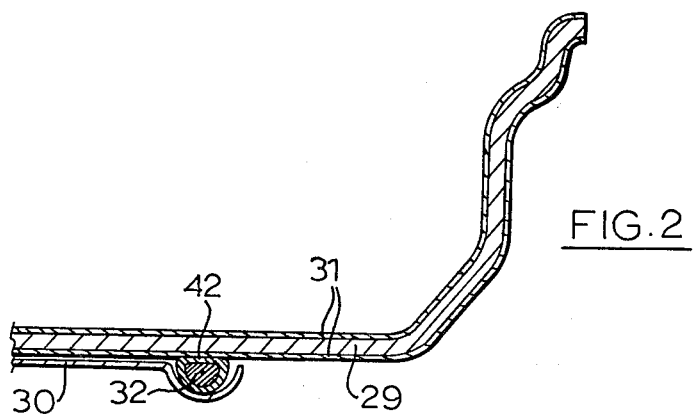
FIG. 2 is a cross-sectional view taken on the line of 2—2 of FIG. 1.

Reference is first made to FIG. 1 which shows a preferred embodiment 20 of an electric frying pan according to the invention and designated generally by the numeral 20. The preferred embodiment includes a conventional pan 22 having a bottom 24 and side wall 26, feet 23, handles 25, a lid 27, a heating unit 28 and a circular support plate 30. As illustrated in FIG. 2 the pan 22 is constructed with an aluminum core 29, which facilitates heat distribution, and stainless steel skins 31 one on each of the surfaces of the aluminum core 29 to provide outer surfaces that are easy to clean.

The heating unit 28 includes a heating element 32 which is formed generally in circular fashion and is of conventional construction with an electrical resistance element surrounded by a heat conductive but electrical resistant material. The ends of the heating element, and particularly its electrical resistance element terminate, in electrical contacts 36 in an electrical plug receptacle 34. This plug receptacle 34 includes a housing 38 with a scalloped inner end 40 shaped so that, when the heating unit 28 and support plate 30 are fastened to the pan bottom 24, it fits snugly where the wall 26 blends into the pan bottom 24. The remainder of the plug receptacle 34 is similar to conventional plug receptacles which are used with this type of heating element.

From FIG. 2 it can be seen that the element 32 is somewhat semi-circular in cross-section, there being a flat upper side 42 for maximum contact with the flat pan bottom 24. The rounded side of the element 32 can be coated, for example with a silicone rubber, to reduce the heat dissipated from that area of the element.

The support plate 30 is formed with a circular valley-shaped depression 44 of the same inner and outer circumference as the element 32 and in which the element 32 will lie with its flat side 42 uppermost. The depth 46 of the depression 44 is less than the thickness 48 of the element 32 in order to ensure contact of element 32 with the pan bottom 24 as will be described below. The support plate 30 defines a contoured gap 50 through which can pass the ends of the element 32 which lead to the electrical plug receptacle 34. The support plate further includes five holes 52, four of which are spaced adjacent the outside of the support plate 30 and the fifth of which is positioned adjacent its centre and through which threaded studs 54, attached to the pan bottom 24, will pass. The threaded studs 54 are welded to the pan bottom 24 by a means of welding commonly referred to as stud welding. The support plate is preferably of stainless steel to minimize heat conduction therethrough and to facilitate ease of cleaning.

To assemble the preferred embodiment, the element 32 of the heating unit 28 is placed in the depression 44 in the support plate 30 with its flat side 42 facing up and with the ends of the element 32 which lead to the plug receptacle 34 lying in the gap 50. The heating unit 28 and support plate 30 are positioned on the pan bottom 24 so that the threaded studs 54 pass through the holes 52 in the support plate 30. Washers 56 and threaded locknuts 58 are tightened onto each stud 54 to draw up the heating unit 28 and support plate 30 tight with the pan bottom 24. Feet 23 and handles 25 can be fastened to the pan 22 by conventioned screw means.

With the heating unit 28 and the support plate 30 secured tightly to the pan bottom 24, as illustrated in FIG. 2, the element 32 is in slight compression as a result of its thickness 48 being greater than the depth 46 of the depression 44 in the support plate 30. At the same time, there is a slight tension in the studs 54 caused by the tightening of the locknuts 58. Locknuts 58 are relied on to maintain the element 32 in flush contact with the pan bottom 24 and to prevent accidental separation.

When immersed in water, for example for cleaning, water may tend to collect in the area above the support plate. In the preferred embodiment, the support plate 30 further defines four openings 60 adjacent its centre, for draining any water so trapped.

When the heating unit 28 fails, it can be replaced by removing the locknuts 58, disengaging that heating unit from the studs 54 and then fastening another heating unit to the pan bottom as described above.

The result of embodiment 20 is to maintain the flat side 42 of the element 32 in full contact with the pan bottom 24 ensuring maximum thermal contact and optimum heat distribution through an aluminium core 29, while at the same time providing a heating unit 28 that can be replaced once it fails.

It will be appreciated from the foregoing that the invention can take many forms consistent with utilizing a heating unit and support plate of dimensions which, when assembled and fastened to the pan bottom, place the complete heating element under a compressive load, the fastening means maintaining this load on the heating element in addition to rendering the heating unit as a whole replaceable. A heating element and support plate could be used which are of a shape other than circular. In addition, a heating element of circular cross-section, rather than the somewhat semi-circular cross-section described above with reference to the preferred embodiment, could be used although this would result in line contact with the pan bottom rather than the preferred surface contact. The number of studs and locknuts described with reference to the preferred embodiment can be varied provided the complete heating element is maintained in good thermal contact with the pan bottom. It will also be appreciated that heating assemblies as described herein may be used on other devices or appliances which utilize heating elements such as kettles, coffee urns and the like.

What we claim as our invention is:

1. An improved electric frying pan comprising:
   a pan constructed of an aluminum core and a layer of stainless steel on each of the surfaces thereof and including a bottom and a continuous peripheral side wall upstanding from the bottom, and at least two threaded studs connected to the underside of said bottom in spaced relationship with each other;
   means, resistant to heat conduction, to support said pan in an elevated position;
   a plurality of washers and companion threaded lock nuts adapted to be received as a set on each of said studs;
   an electrically insulated heating element of a generally circular cross-section including a flat upper surface portion for contacting the bottom of said pan, said element adapted to be connected to an electrical source;
   a support plate defining a depression of depth less than the thickness of said heating element and into which said heating element will lie, a series of first holes for engagement over said studs and a plurality of second holes adjacent the centre of said plate for drainage of water that may become trapped above said support plate;
   in which by advancing said nuts onto said studs until said nuts are tight to the support plate, all parts of said heating element are subject to a compressive load.

2. An improved electric frying pan as claimed in claim 1 wherein said heating element is circular in shape.

3. An improved electric frying pan as claimed in claim 1 or claim 2 wherein;
   said pan is fitted with a lid adapted with a lifting means resistant to heat conduction, said pan further having at least two lifting handles composed of material resistant to heat conduction;
   said support means comprising a plurality of feet composed of material resistant to heat conduction.

4. An improved electric frying pan as claimed in claim 1 or claim 2 wherein:
   said support plate is constructed of stainless steel; and,
   said heating element is coated on its rounded surface area with a layer of silicone rubber.

* * * * *